Dec. 18, 1962  G. B. KNAPMEYER  3,068,966
BRAKE CONTROLLER
Filed March 30, 1960  2 Sheets-Sheet 1

INVENTOR.
GILBERT B. KNAPMEYER
BY
Meyer, Baldwin, Doran & Young
ATTORNEYS

Dec. 18, 1962 G. B. KNAPMEYER 3,068,966
BRAKE CONTROLLER
Filed March 30, 1960 2 Sheets-Sheet 2

INVENTOR.
GILBERT B. KNAPMEYER
BY
Meyer, Baldwin, Doran & Young
ATTORNEYS

United States Patent Office 3,068,966
Patented Dec. 18, 1962

3,068,966
BRAKE CONTROLLER
Gilbert B. Knapmeyer, Covington, Ky., assignor, by mesne assignments, to McGraw-Edison Company, a corporation of Delaware
Filed Mar. 30, 1960, Ser. No. 18,583
5 Claims. (Cl. 188—170)

The invention relates to means for applying a variably controllable braking force to a rotating member, and more particularly to a brake drum attached to such member.

In one specific embodiment of the invention described and illustrated herein the inventive means embodies a two-position braking control, one such position characterized by a fully applied, heavy braking force, and the other position characterized by a partially applied lighter braking force.

In particular, there are certain types of rapidly rotatable machine elements which must be intermittently slowed to a stop, at the close of a work cycle, for example by a gradually effective braking torque, concluding with an "inching" approach to an accurately registered position, under positively appliable braking forces. A specific example of this sequence of operations is the stopping of a washer-extractor cylinder in the laundry washing or dry cleaning field. The initial controlled braking effect is used to bring the heavy, rapidly revolving cylinder to a stop at a rate gradual enough to avoid excessive stress on the drive or brake. Thereafter the cylinder must be "inched" around until its door (or one of its doors) is in registration with the outer door on the fixed tub or housing. During the "inching" energizations of the cylinder driving motor the brake is held in a partially-on, controlled position, followed by a fully-on braking force applied coincidentally with each de-energization of the motor so that when the desired, accurate registration of the two doors is reached the cylinder stops positively, avoiding overrunning or backward slip.

An object of the present invention, therefore, is to provide controlled gradual braking means as well as an abrupt, heavy braking.

A further object of the invention is to provide a simple, power-operated, two-position brake controller applicable to any appropriate braking system.

Other objects and advantages will be apparent from a study of the following description of one exemplification of the invention, in conjunction with the accompanying drawings, in which FIG. 1 is a side elevational view of a laundry washer-extractor equipped with my novel braking system.

While in the succeeding pages of this specification I will describe the operation of the invention with particular application to the control of a washer extractor there are of course numerous ways in which the novel control can be adapted for use in the application of frictional braking pressure to moving parts of other machines. The following description is illustrative merely, and not limiting.

Figure 1:
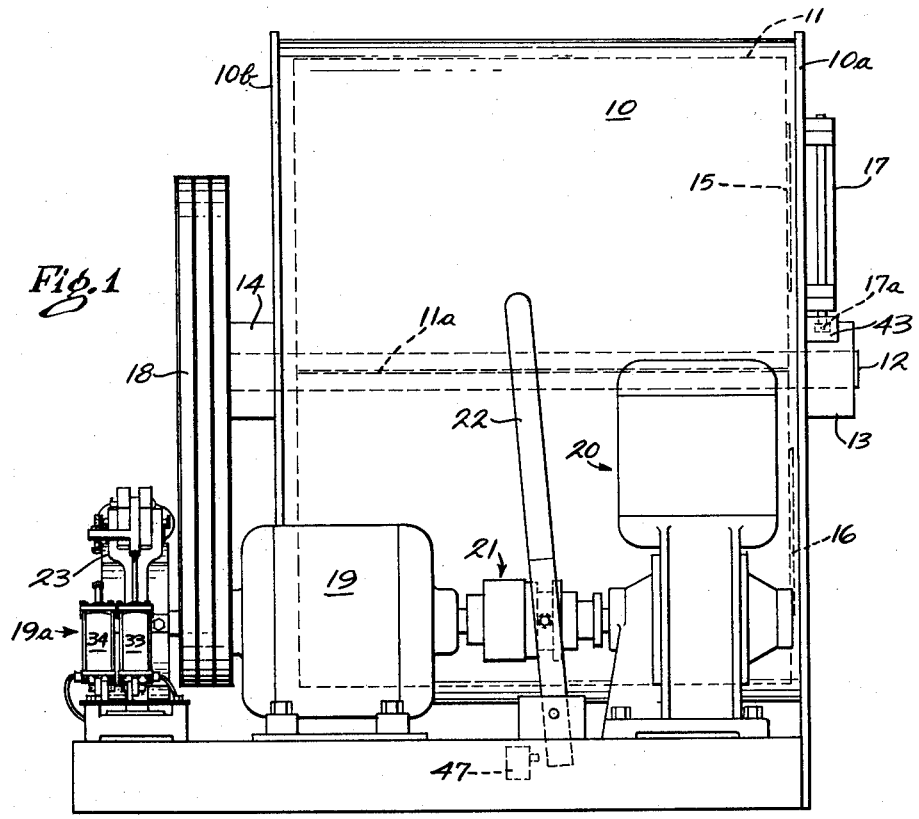
Figure 2:
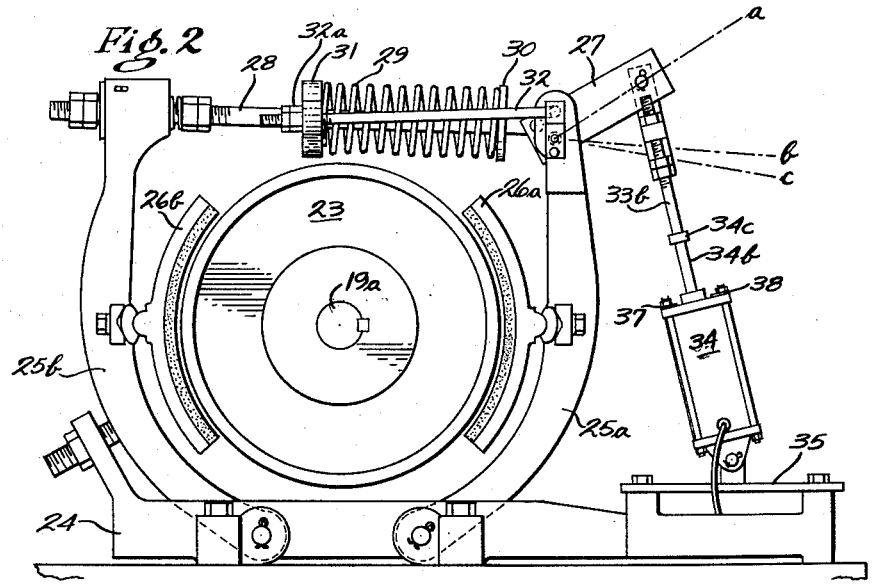
FIG. 2 is an elevational view as seen from the left end of FIG. 1, and somewhat enlarged, showing certain brake elements and controlling means.

Proceeding now to a description of the washer-extractor shown in the drawings, and with reference at first to FIGS. 1 and 2, there is shown a stationary outer tub 10 enclosing an inner rotatable cylinder 11 which is supported at each end by shaft 12 journalled in bearing structures 13, 14 on the front and back tub walls 10a, 10b. The cylinder is divided by a partition 11a into two compartments, each compartment being provided with a door 15, 16 on the forward wall. Each door may in turn be brought into registry with tub door 17 for loading and unloading.

The cylinder is driven by a set of belts 18 running from the cylinder sheave to a sheave on the extractor motor 19. This motor is aligned with the speed reducer of wash drive motor unit 20, and is connectable therewith through a clutch 21. The latter may be operated automatically, but is here shown as operated manually, by a lever 22. When the lever is swung to the left, as shown, the clutch is engaged, and washer motor unit 20 drives through unenergized motor 19. When the clutch is disengaged the extractor motor 19 may be operated, this arrangement being conventional.

The brake may be in any appropriate location, and the brake drum 23 is here shown as mounted on the extended shaft 19a of motor 19. The brake itself is not specifically a part of the present invention. The two-position operating device is applicable to various suitable types of brakes, and is a commercially available design. Pivotally mounted in a base member 24 are a pair of arms 25a, 25b, carrying brake shoes 26a, 26b. An operating lever 27 is pivotally mounted in the bifurcated upper end of arm 25a. Connected pivotally to this lever a short distance from the mounting pivot is an operating rod 28, rockably connected at its other end to arm 25b. A compression spring 29 over rod 28 bears at one end against a disc 30 secured to the rod, and at the other end against a piece 31 which is slidable on rod 28 and extends out at each side to hold a pair of pull rods 32. These connect to the arm 25a. The brake is of the spring-applied type wherein spring 29 tends to apply braking torque, therewith swinging operating lever 27 clockwise from the fully released position shown at "a."

Figures 3, 4, 5:
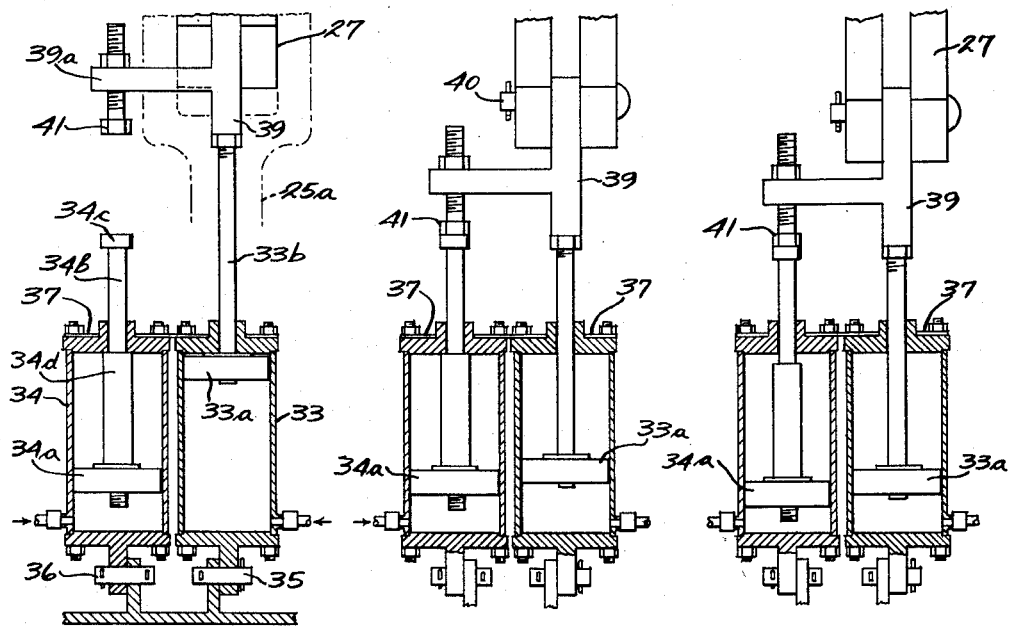
FIGS. 3, 4 and 5 show, partly in vertical section, and partly in elevation, two brake controlling power cylinders with movable elements in different operated positions.

The controller or actuating device comprising air motors 33, 34, therefore acts to release the brake in opposition to spring 29. Each motor includes a cylinder assembly pivotally mounted on a base plate with pins 35, 36. A single pin could be used, and while the two cylinders are here shown as being joined across the top by flat strips 37, 38, the two cylinder structures could be integral. Cylinder 33 has a piston 33a, with a piston rod 33b threaded into a connecting member 39 which is pivotally connected to operating lever 27 by a pin 40. This is the primary motor and, disregarding the cooperation of motor 34 for the moment, functions simply to release the brake, position "a," or permits its full application, position "c." Motor 34 has a piston 34a and piston rod 34b. The latter, however, is not directly connected to the brake operating lever but has its end 34c adapted to contact an abutment screw 41 threaded through a lateral arm 39a of member 39. The stroke of this motor is limited. This could, of course, be accomplished in various ways, e.g., by using a short cylinder; or, as here disclosed, by having a stop or shoulder on the piston rod, provided by an enlarged portion or sleeve 34d. When motor 34 is energized, with motor 33 unenergized, it holds the brake lever in a position such as "b" in FIGURE 2, and in the sectional view of FIGURE 4, whereat the brake is being applied with less than full force by spring 29. This position can, of course, be determined by initially setting the braking force of the spring and the approximate position of lever 27, using nuts 32a and 28a in the embodiment shown. Thereafter, abutment screw 41 may be adjusted to effect braking of the washer at a desired rate which actually is slower than might be inferred from the short distance between positions "b" and "c."

Figure 6:
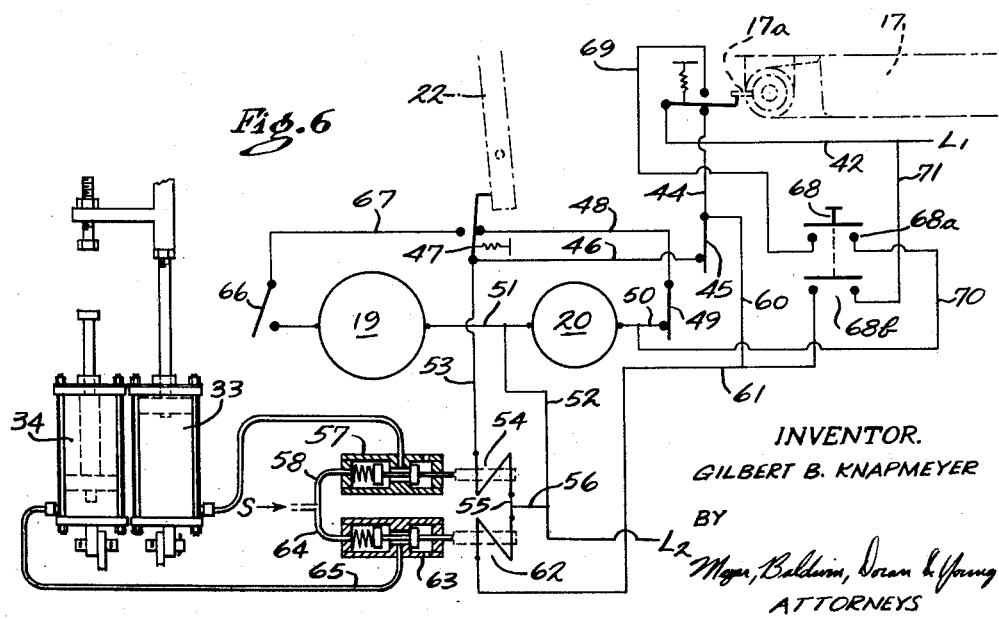
FIG. 6 shows diagrammatically the tie-in of the brake controller with associated parts of the machine and its control.

FIGURE 6 shows the various control components in the position occupied with the machine in its washing phase. The tub door 17 is closed, the clutch lever 22 is in its left hand position, washer motor 20 is energized, and the brake is released. Tracing the circuits shown in FIG. 6, motor 20 is energized as follows: $L_1$, line 42, 2-position door switch 43 and lower contact thereof (held there by actuator 17a, or other part of door, when door is closed, and movable to upper contact when door is open), line 44, switch 45, line 46, clutch switch 47 and right hand contact thereof, line 48, switch 49, line 50, motor 20, and lines 51, 52 to $L_2$.

The brake is being held released by a solenoid 54 as follows: $L_1$, line 42, switch 43, line 44, switch 45, lines 46 and 53, valve solenoid 54, and lines 55, 56 and 52 to $L_2$. Solenoid 54 holds air valve 57 open, air from source S and pipe 58 being thereby admitted by way of pipe 59 to cylinder 33. Cylinder 34 is also energized, although for the time being with no effect, as follows: $L_1$, line 42, switch 43, lines 44, 60 and 61, valve solenoid 62, and lines 55, 56, and 52 to $L_2$. Valve 63 is thus open, admitting air from pipe 64 through pipe 65 to cylinder 34.

At the conclusion of the washing step, switch 49 is opened, the clutch is moved to its right-hand (disengaged) position, and switch 66 is closed to start extractor motor 19. Switches 49 and 66 are indicated as simple, manually-operated open-close switches, but they may, of course, be magnetically-operated starter switches, controlled automatically by a formula control, etc. Motor 19 is energized from $L_1$, line 42, switch 43, line 44, switch 45, line 46, switch 47 and the left-hand contact thereof, line 67, switch 66, motor 19, and lines 51 and 52 to $L_2$. The brake circuits remain as before. Extraction therefore proceeds at a relatively high rotational rate.

At the conclusion of the extraction, switch 66 is opened to de-energize motor 19. Then switch 45 is opened. As previously traced, this switch controls current to motors 19 and 20, and also to valve solenoid 54, so cylinder 33 is now de-energized. Cylinder 34 remains energized, however, and the brake is permitted to move only to the controlled position "b," abutment screw 41 contacting piston rod head 34c, FIGURE 4, as before explained. The work-containing cylinder 11 is thereupon brought to a stop by a light but steady brake pressure.

When the cylinder stops, tub door 17 may be opened and one of the cylinder doors must then be brought into registry therewith. This is done by using the "Inch" pushbutton 68, having first shifted the clutch lever 22 back to the left to re-engage the wash motor. With the door open, switch 43 moves to its upper contact. This opens the previously outlined circuits to motors 19 and 20, and sets up a new circuit to wash motor 20 alone, to be completed by pushbutton 68. Also, this opens the circuit that has been holding valve solenoid 62 energized, so that cylinder 34 is now de-energized, and since cylinder 33 is already de-energized, the brake is now fully applied, FIGURE 2, "C," and FIGURE 5. Pushbutton 68 controls two circuits. One circuit is to the wash motor 20, going from $L_1$, line 42, switch 43 and upper contact thereof, line 69, switch contacts 68a, lines 70 and 50, motor 20, and lines 51 and 52 to $L_2$. The second circuit simultaneously, is to valve solenoid 62, going from $L_1$, lines 42 and 71, switch contacts 68b, line 61, solenoid 62, and lines 55, 56 and 52 to $L_2$. This energizes air cylinder 34, the resultant lightening of the braking force permitting the wash motor to move the machine cylinder. When the pushbutton 68 is released, the motor 20 and air cylinder 34 are de-energized, and the machine cylinder stops immediately, with brakes fully applied. Conventionally, in inching a cylinder having a regular on-off brake, the brake has been released completely while the inching switch is held depressed.

What is claimed is:

1. Brake control mechanism of the character described for controlling applications of a variable braking force to a moving element, said mechanism including a brake applying member movably disposed adjacent to said moving element, means biasing said brake applying member to a brake-applied position, a first powered means effective to oppose said biasing means whereby to produce a decreased increment of brake application movement under moderate pressure, positive stop means limiting said first increment of movement, and a second powered means also opposing said biasing means and adapted to cause a complete relief of brake application movement, said first powered means being disposed laterally from said second powered means and operable independently of said second powered means.

2. Control mechanism as defined in claim 1 wherein means is provided for adjusting the position of said positive stop.

3. Brake control mechanism of the character described for selectively controlling applications of a variable braking force to a rotating brake drum, said mechanism including a brake shoe disposed adjacent the periphery of said drum, means biasing said brake shoe to brake applied position, a brake-operating linkage operatively associated with said shoe whereby, by linkage movement, to move said shoe towards and away from said drum, a first power cylinder, a second power cylinder, a first connecting rod operatively responsive to said first power cylinder and effective upon said linkage to oppose said biasing means and produce a limited increment of movement of said linkage whereby to cause a moderately decreased braking pressure of said shoe against said drum, means interposing a positive stop to terminate said limited increment of movement, and a second connecting rod operatively responsive to said second power cylinder, and effective upon said linkage to further oppose said biasing means, whereby to cause complete relief of braking pressure of said shoe against said drum, said first power cylinder being disposed laterally from said second power cylinder and being operable completely independently of said second power cylinder, said first connecting rod having an abutment portion providing a second positive stop for said brake applying linkage when said linkage is moved in a first increment of movement towards brake-applied position by the said brake shoe biasing means, said first power cylinder being still energized.

4. Brake control mechanism of the character described for selectively controlling applications of a variable braking force to a rotating brake drum, said mechanism including a pair of brake shoes disposed adjacent to spaced areas of said drum, spring means biasing each said brake shoe to brake-applied position, a linkage operatively effective simultaneously on both said brake shoes whereby, by linkage movement, to cause or prevent application of each said shoe to said drum, a first power cylinder, a second power cylinder, a first connecting rod operatively responsive to said first power cylinder and effective upon said linkage to oppose spring bias and produce a first and limited increment of movement whereby to cause a moderate decrease in braking pressure of said shoes against said drum, means interposing a positive stop to terminate said first limited increment of movement, and a second connecting rod operatively responsive to said second power cylinder, and effective upon said linkage to produce a further increment of movement whereby to cause complete relief of braking pressure of each said shoe against said drum, said first power cylinder being disposed laterally from said second power cylinder and being operable completely independent of said second power cylinder.

5. Brake control mechanism of the character described for selectively controlling applications of a variable braking force to a rotating brake drum, said mechanism including a barke shoe disposed adjacent the periphery of said drum, spring means biasing said brake shoe to brake-applied position, a brake-operating linkage operatively associated with said shoe whereby, by linkage movement, to permit or prevent application of said shoe to said drum, a first power cylinder, a second power cylinder, a first connecting rod operatively responsive to energization of said first power cylinder and effective upon said linkage to cause a first and limited increment of movement whereby to moderately reduce braking pressure of said shoe against said drum, means interposing a positive stop to terminate said first limited increment of movement, and a second connecting rod operatively responsive to energization of said second power cylinder, and effective upon said linkage to cause a further increment of movement whereby to completely relieve braking pressure of said shoe against said drum, said first power cylinder being disposed laterally from said second power cylinder and being operable completely independently of said second power cylinder, said first connecting rod having an abutment portion providing a second positive stop for said brake applying linkage when said linkage is moved in a first increment of movement towards brake-applied position by the said brake shoe biasing means, said first power cylinder being still energized.

References Cited in the file of this patent

UNITED STATES PATENTS

| | | |
|---|---|---|
| 772,903 | Oppermann | Oct. 18, 1904 |
| 1,561,342 | Martin | Nov. 10, 1925 |
| 1,563,544 | Atkinson | Dec. 1, 1925 |
| 2,308,299 | Page | Jan. 12, 1943 |
| 2,554,330 | Hodgson | May 22, 1951 |

FOREIGN PATENTS

| | | |
|---|---|---|
| 785,942 | Great Britain | Nov. 6, 1957 |